(12) United States Patent
Endoh et al.

(10) Patent No.: US 7,564,234 B2
(45) Date of Patent: Jul. 21, 2009

(54) SEAT POSITION DETECTING APPARATUS, A RAIL POSITION DETECTING APPARATUS AND A MOVABLE BODY DETECTING APPARATUS

(75) Inventors: Hirofumi Endoh, Toyota (JP); Satoru Tagawa, Takahama (JP); Yoshitaka Koga, Chiryu (JP); Yasuhiro Kojima, Kariya (JP); Takashi Suzuki, Obu (JP); Hiroshi Tamura, Toyota (JP); Yasunori Hasegawa, Kasugai (JP); Masato Ohchi, Toyota (JP)

(73) Assignee: Aisin Seiki Kabushiki Kaisha, Kariya-Shi, Aichi-Ken (JP)

( * ) Notice: Subject to any disclaimer, the term of this patent is extended or adjusted under 35 U.S.C. 154(b) by 509 days.

(21) Appl. No.: 10/742,753

(22) Filed: Dec. 23, 2003

(65) Prior Publication Data

US 2005/0057065 A1 Mar. 17, 2005

(30) Foreign Application Priority Data

Dec. 24, 2002 (JP) ............................. 2002-373002

(51) Int. Cl.
*G01B 7/14* (2006.01)
*B60N 2/02* (2006.01)

(52) U.S. Cl. ................................ 324/207.24; 296/65.13
(58) Field of Classification Search .............. 324/207.2, 324/207.21, 207.24, 207.22, 251, 252; 280/735; 296/65.13, 65.01, 68.1; 248/429
See application file for complete search history.

(56) References Cited

U.S. PATENT DOCUMENTS

| | | | |
|---|---|---|---|
| 4,780,778 A | * | 10/1988 | Gunji et al. ............... 360/294.1 |
| 4,810,967 A | * | 3/1989 | Yokoyama et al. ....... 324/207.2 |
| 6,010,191 A | | 1/2000 | Calinaud et al. |
| 6,053,529 A | | 4/2000 | Frusti et al. |
| 6,095,555 A | * | 8/2000 | Becker et al. ............... 280/735 |

(Continued)

FOREIGN PATENT DOCUMENTS

DE 295 19 083 U1 1/1996

(Continued)

OTHER PUBLICATIONS

Official Letter/Examination Report issued by the German Patent Office in corresponding German Application No. 103 61 028.6-14, and English translation thereof.

(Continued)

*Primary Examiner*—Kenneth J Whittington
(74) *Attorney, Agent, or Firm*—Buchanan Ingersoll & Rooney PC (57) ABSTRACT

A seat position detecting apparatus includes a fixed rail fixed on a vehicle floor, a movable rail at which a vehicle seat is supported for sliding on the fixed rail, and a position detecting mechanism directly mounted at one of either the fixed rail or the movable rail for detecting a relative position between the fixed rail and the movable rail by detecting the other of either the fixed rail or the movable rail, wherein a first engaging mechanism is provided at either the fixed rail or the movable rail at which the position detecting mechanism is mounted, and a second engaging mechanism provided complementarily to the first engaging mechanism engages with the first engaging mechanism through the position detecting mechanism.

10 Claims, 6 Drawing Sheets

U.S. PATENT DOCUMENTS

| | | | |
|---|---|---|---|
| 6,356,200 | B1 | 3/2002 | Hamada et al. |
| 6,683,544 | B2 * | 1/2004 | Tokunaga et al. ............. 341/15 |
| 6,767,029 | B2 | 7/2004 | Jaudouin et al. |
| 6,774,625 | B2 * | 8/2004 | Suzuki et al. .......... 324/207.24 |
| 6,851,655 | B2 * | 2/2005 | Kume et al. .................. 248/429 |
| 6,921,107 | B2 * | 7/2005 | Mills et al. .................. 280/735 |
| 7,147,261 | B2 * | 12/2006 | Ventura et al. ........... 296/65.13 |
| 2002/0145418 | A1 | 10/2002 | Becker |

FOREIGN PATENT DOCUMENTS

| | | |
|---|---|---|
| DE | 198 13 517 A1 | 3/1998 |
| DE | 100 48 270 A | 4/2002 |
| EP | 1 184 264 A1 | 3/2002 |
| EP | 1 199 211 A | 4/2002 |
| JP | 2001-130369 | 5/2001 |
| JP | 2001-157620 | 6/2001 |
| JP | 2001-158269 | 6/2001 |
| JP | 2001-264346 | 9/2001 |
| JP | 2002-200933 | 7/2002 |

OTHER PUBLICATIONS

Official Letter dated Sep. 15, 2008 issued by German Patent Office and Minutes of Interview, and English language translation of same.
Official Letter dated Sep. 16, 2008 issued by Japanese Patent Office and English language translation of same.

* cited by examiner

SEAT POSITION DETECTING APPARATUS, A RAIL POSITION DETECTING APPARATUS AND A MOVABLE BODY DETECTING APPARATUS

This application is based on and claims priority under 35 U.S.C. § 119 with respect to Japanese Application No. 2002-373002 filed on Dec. 24, 2002, the entire content of which is incorporated herein by reference.

FIELD OF THE INVENTION

This invention generally relates to a seat position detecting apparatus, a rail position detecting apparatus and a movable body detecting apparatus.

BACKGROUND OF THE INVENTION

It is known that a vehicle includes an air bag apparatus for protecting passenger. On the other hand, a pair of seat slide portions is provided at both the left and the right sides of a vehicle seat for adjusting a seat position in longitudinal direction of the vehicle.

When the air bag apparatus is operated with a certain amount of an operating force relative to the passengers, an effect of the air bag apparatus may be changed depending on the vehicle seat position (a position of the passenger). In other word, a preferred effect may not be obtained when the seat is away from the air bag apparatus. Then, it is proposed that the operating force for operating the air bag apparatus can be switched depending on the vehicle seat position. In addition, it is known that some vehicle seats include a seat position detecting apparatus for switching the operating force for operating the air bag apparatus.

Figure 7:
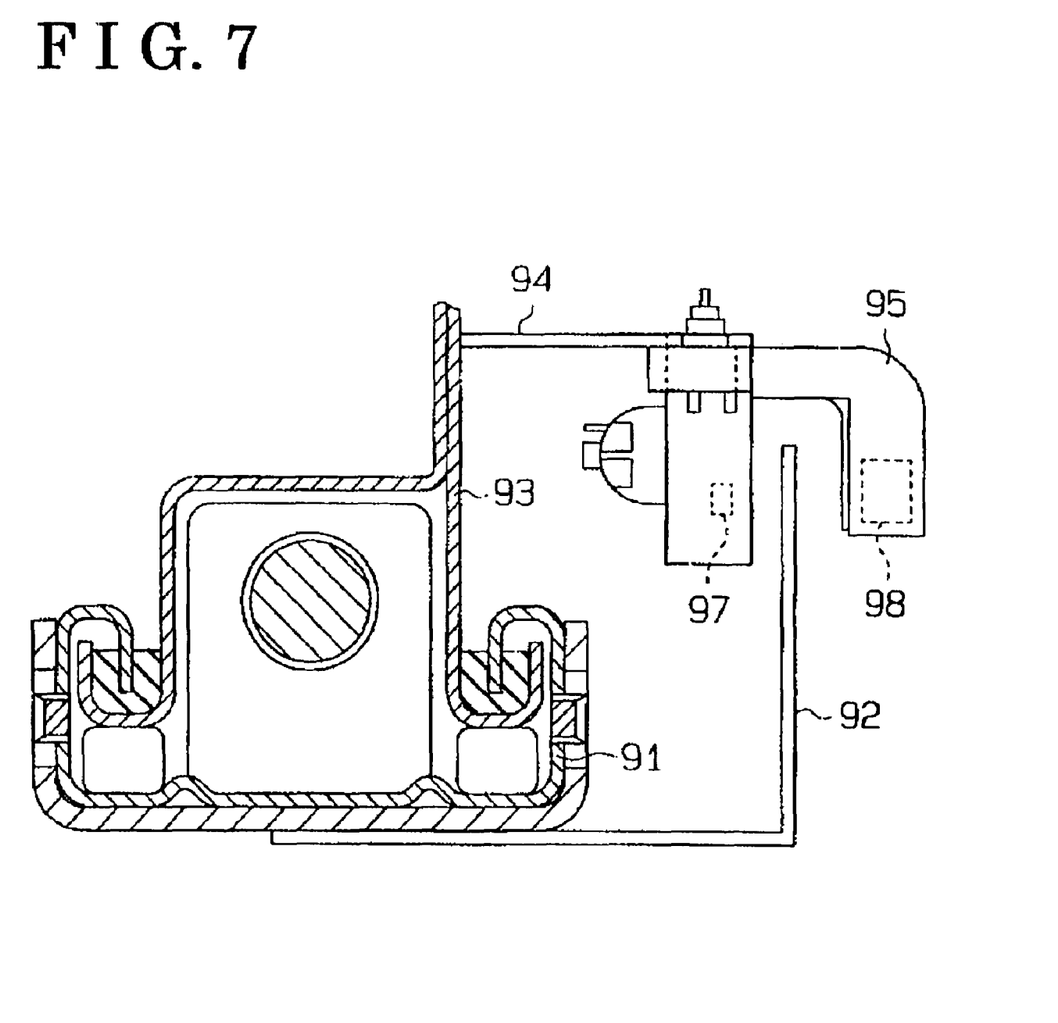
FIG. 7 illustrates a cross-sectional view of a known embodiment.

An example of the known seat position detecting apparatus is shown in FIG. 7. The vehicle seat position detecting apparatus includes an object board 92 fixed at a lower rail 91 and a sensor 95 fixed at an upper rail 93 with a bracket 94. The seat slide portion includes the lower rail 91 and the upper rail 93. The upper rail 93 is provided slidably on the lower rail 91 in the longitudinal direction of the vehicle. The, sensor 95 has two vertical portions extending in vertical direction and houses a magneto-electric converting element 97 at one end thereof and a magnet 98 at the other end thereof.

Depending on the vehicle seat position, the object board 92 may be or may not be located between the magneto-electric converting element 97 and the magnet 98 (the position of the upper rail 93). When the object board 92 is located between the magneto-electric converting element 97 and the magnet 98, a magnetic force from the magnet 98 is blocked by the object board 92 and not applied to the magneto-electric converting element 97. On the other hand, when the object board 92 is not located between the magneto-electric converting element 97 and the magnet 98, the magnetic force from the magnet 98 is applied to the magneto-electric converting element 97 without blocking by the object board 92. Thus, the vehicle seat position detecting apparatus (sensor 95) can detect the vehicle seat position based on the magnetic force applied to the magneto-electric converting element 97. Thus, the magnetic force applied to the magneto-electric converting element 97 has been changed in response to the existence of the object board 92.

According to the known seat position detecting apparatus, the object board 92 is additionally needed at the lower rail 91, and the bracket 94 is additionally needed at the sensor 95 for detecting the object board 92. Furthermore, there is a need to save a space in which the object board 92 and the sensor 95 can move along the lower rail 91 and the upper rail 93. Thus a space under the vehicle seat is limited, and the mountability of the vehicle seat position detecting apparatus becomes worse.

A known seat position detecting apparatus in which the mountability is improved while the number of the members thereof is reduced is disclosed in Japanese Patent Laid-Open Publication published as No. 2002-20093. This disclosed seat position detecting apparatus detects the vehicle seat position by detecting the lower rail by a sensor portion provided at the upper rail.

In the configuration of the disclosed seat position detecting apparatus, however, the sensor portion is still provided with the bracket. In other words, the sensor portion is provided hanging over the lower rail. In addition, the sensor portion includes a L-shaped side surface and detects whether or not the lower rail is in a space formed by connecting two ends of the L-shaped side surface and an opposite corner relative to a corner of the L-shaped side surface in a cross-sectional view. Thus, the sensor detects the vehicle seat position depending on the magnetic force applied to the magneto-electric converting element. In this configuration, however, there is a need to save a space in which the sensor portion can moves along the lower rail in longitudinal direction of the vehicle. Thus a space under the vehicle seat is limited.

The current invention provides a seat position detecting apparatus, a rail position detecting apparatus and a movable body detecting apparatus which can improve the mountability of the position detecting means.

SUMMARY OF THE INVENTION

According to an aspect of the present invention, a seat position detecting apparatus includes a fixed rail fixed on a vehicle floor, a movable rail at which a vehicle seat is fixed for sliding on the fixed rail, and a position detecting means mounted at one of either the fixed rail or the movable rail for detecting a relative position between the fixed rail and the movable rail by detecting the other of either the fixed rail or the movable rail; wherein a first engaging means is provided at either the fixed rail or the movable rail at which the position detecting means is mounted, and a second engaging means provided complementarily to the first engaging means engages with the first engaging means through the position detecting means.

In addition, according to an aspect of the present invention, a rail position detecting apparatus includes a position detecting means provided at one of either a fixed rail or a movable rail sidably engaging each other, and the other of either the fixed rail or the movable rail is defined as an object; wherein the position detecting means detects the object by a magnet and a magneto detecting element, and the object is not provided between the magnet and the magneto detecting element.

It is preferable that the rail position detecting apparatus includes a position detecting means provided at one of either a fixed rail or a movable rail slidably engaging each other, and the other of either the fixed rail or the movable rail is defined as an object; wherein the position detecting means detects the object with a magnet and a magneto detecting element, and the position detecting means detects the object based on a magnetic flux from the magnet flows out and flows in through a surface at which the position detecting means faces to the object.

In addition, according to an aspect of the present invention, a movable body position detecting apparatus includes a position detecting means provided at one of either a guide member or a movable member slidably engaging each other, and the other of either the guide member or the movable member is defined as an object, wherein the position detecting means detects the object with a magnet and a magneto detecting element, and the object is not provided between the magnet and the magneto detecting element.

BRIEF DESCRIPTION OF THE DRAWING FIGURES

The foregoing and additional features and characteristics of the present invention will become more apparent from the following detailed description considered with reference to the accompanying drawing figures in which like reference numerals designate like elements and wherein.

DETAILED DESCRIPTION OF THE INVENTION

Figure 1:
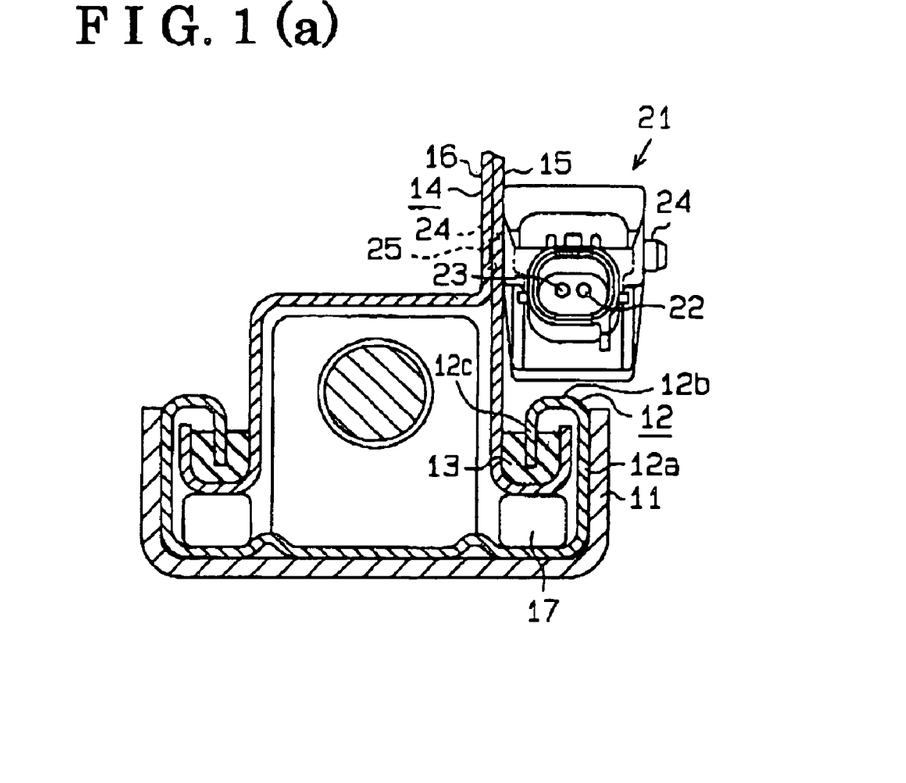
FIG. 1 illustrates a cross-sectional view and a side view of an embodiment of the current invention.

A preferred embodiment of the current invention will be described hereinbelow in detail with reference to accompanying drawings, FIG. 1 through FIG. 6. FIG. 1 particularly illustrates a seat slide portion of the vehicle seat according to the current invention, and FIG. 1(b) illustrates a side view of the seat slide portion, and FIG. 1(a) illustrates a cross-sectional view of the FIG. 1(b) along A-A line. The seat slide portions are mounted on the left and the right sides of the vehicle seat for adjusting the vehicle seat position in longitudinal direction of the vehicle. However, a seat slide sensor 21 may be mounted to the one seat slide portion. In the embodiment of the current invention, a configuration of the seat slide portion provided on the one side of the vehicle seat will be explained, however, a configuration of the seat slide portion provided on the other side of the vehicle seat will not be explained.

As shown in FIG. 1, a supporting frame 11 being approximately U-shaped in cross section is fixed on the vehicle floor (not shown) in the longitudinal direction of the vehicle. A lower rail 12 made of iron is housed in the supporting frame 11 along a shape of the supporting frame 11. The lower rail 12 includes an outer surface being approximately U-shaped along an inner surface of the supporting frame 11. As shown in FIG. 1(a), first vertical portions 12a of the lower rail 12 extend along the vertical portions of the supporting frame 11, and vertically extend from top portions thereof in facing direction and form horizontal portions 12b, then further extend approximately in parallel with the vertical portions of the supporting frame 11 and form second vertical portions 12c. Rubber members 13 are mounted to each edge of the second vertical portions 12c.

An upper rail 14 made of iron is slidably provided in the longitudinal direction of the vehicle relative to the lower rail 12. Specifically, the upper rail 14 includes a frame 15 and a frame 16 welded each other. The frame 15 and the frame 16 extend approximately in parallel with the first vertical portions 12a of the lower rail 12, then separate and extend in the different directions. The frame 15 and the frame 16 further extend toward the each edge of the second vertical portions 12c of the lower rail 12 and form approximately U-shape along bottom shapes of the rubber members 13 at each end portion thereof. A supporting bases 17 fixed on the bottom portion of the lower rail 12 slidably supports the frame 15 and the frame 16. Thus, the rubber members 13 guide the upper rail 14 at the end portions of the frame 15 and the frame 16 slidably on the lower rail 12

The seat slide sensor 21 is provided at the upper rail 14 for detecting the position of the vehicle seat sliding in the longitudinal direction of the vehicle. The seat slide sensor 21 having an resin outer surface includes a holder portion 21a for housing a magnetic force detecting portion, a connector portion 21b continually formed at the one side of the holder portion 21a (left side in FIG. 1(b)) and a sensor mounting portion 21c continually formed at the other side of the holder portion 21a (right side in FIG. 1(b)). A terminal 22 and 23 extending from the magnetic force detecting portion and connected to an outer connector are housed in the connector portion 21b.

Figure 2:
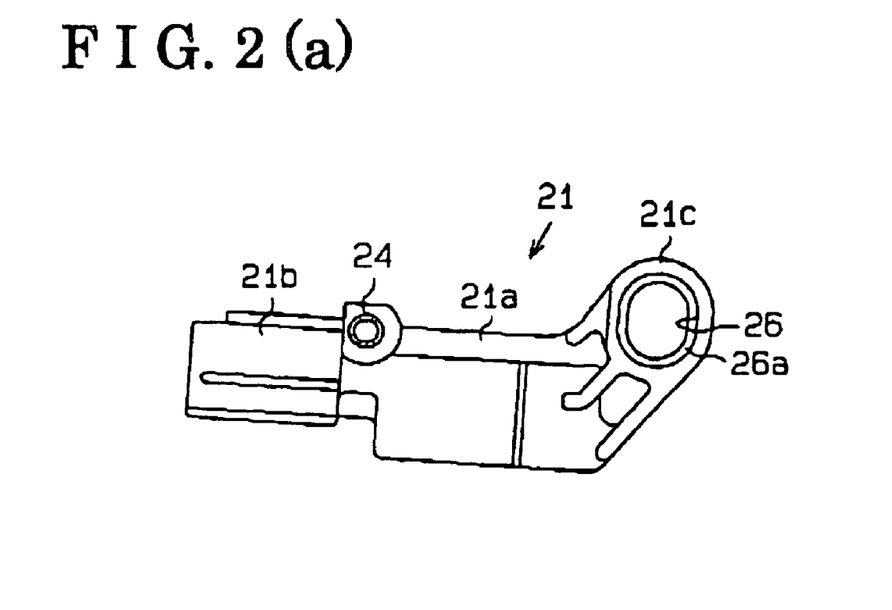
FIG. 2 illustrates side views of the embodiment of the current invention.

As also shown in FIG. 2, a position defining pin 24 is formed integrally with the seat slide sensor 21 at upper portion of a boundary thereof at which the holder portion 21a contacts with the connector portion 21b. The position defining pin 24 projects in one side and the other side relative to the seat slide sensor 21. As shown in FIG. 2(b), a position defining hole 25 is formed in the upper rail 14 complementarily to the position defining pin 24. A position of the seat slide sensor 21 relative to the upper rail 14 is determined at a predetermined position by inserting the position defining pin 24 into the position defining hole 25.

As also shown in FIG. 2(a), an approximately flat-circular hole 26 extending in vertical direction is formed in the sensor mounting portion 21c. A bushing 26a is attached into the hole 26. On the other hand, as shown in FIG. 2(b), a hole 27 is formed in the upper rail 14 corresponding to the hole 26. In addition, a weld nut 28 is welded at the upper rail 14 on the opposite surface at which the seat slide sensor 21 is mounted concentrically with the hole 27. The seat slide sensor 21 is fixed to the upper rail 14 by screwing a bolt into the weld nut 28. The bolt of a second engaging means penetrates through the hole 26 and the hole 27. In this configuration, differences of a mounting position depending on individual products can be reduced by adjusting the mounting position within the approximately flat circular hole 26 extending in vertical direction. The position defining pin 24 inserted into the position defining hole 25 also can prevent the seat slide sensor 21 from being rotated along a rotation of the bolt screwed into the weld nut 28.

The position defining pins 24 are provided on both side of the seat slide sensor 21, so that the seat slide sensor 21 can be mounted at both surfaces of the upper rail 14 provided on the right and the left of the vehicle seat. In FIG. 1(a) illustrates a configuration of the seat slide sensor 21 provided on the right surface of the upper rail 14. The position defining pin 24 may be provided at only the one surface of the seat slide sensor 21 if the position of the seat slide sensor 21 is determined in advance.

A detail of the configuration of the magnetic force detecting portion of the seat slide sensor 21 and a vehicle seat position detecting mechanism will be explained. FIG. 3(a) illustrates a plain view of the seat slide sensor 21, and FIG. 3(b) illustrates a cross-sectional view of the FIG. 3(a) along B-B line. An opening portion of the approximately bottomed box shaped holder portion 21a for housing the magnetic force detecting portion is supposed to be filled with sealant; however, this structure is not illustrated in FIGS. 3(a) and (b) as a matter of convenience.

Figure 3:
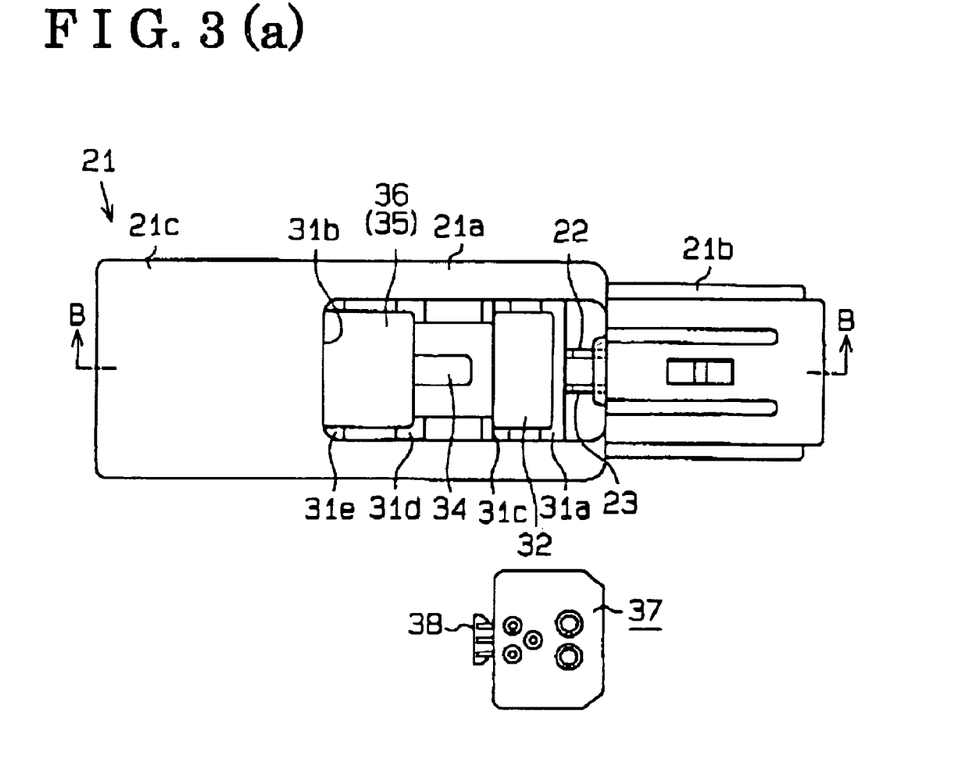
FIG. 3 illustrates a flat view and a cross-sectional view of a sensor of the embodiment of the current invention.

As shown in FIG. 3, the holder portion 21a houses plural guide walls 31c, 31d and 31e in a housing space thereof. The guide wall 31c is provided near a stepped wall 31a formed in the connector portion 21b side, and the guide wall 31e is provided near a sectioning wall 31b dividing the holder portion 21a from the sensor mounting portion 21c. The guide wall 31d is provided between the guide wall 31c and the guide wall 31e. An approximately block-type first yoke 32 is press fitted between the stepped wall 31a and the guide wall 31c. The position of the first yoke 32 is defined by these walls. On the other hand, an approximately block-type magnetic portion 33 is press fitted between the sectioning wall 31b (guide wall 31b) and the guide wall 31d. The position of the magnetic portion 33 is defined by these walls. The magnetic member 33 includes a second yoke 34, a first magnet 35 and a second magnet 36. The second yoke 34 is sandwiched between the first magnet 35 and the second magnet 36. The second yoke 34 includes a projecting portion at approximately the center portion thereof projecting toward the first yoke 32. As described later, the first magnet 35 and the second magnet 36 are magnetized in exactly the same direction, in other words, in the vertical direction relative to the surfaces at which the second yoke 34 contacts with the first magnet 35 and the second magnet 36.

An element basis 37 is housed between the connector portion 21b and the guide wall 31c upper the first yoke 32. In FIG. 3(a), the element basis 37 is taken off as a matter of convenience. A magneto-electric converting element 38 extends from the element basis 37 in approximately the vertical direction through the terminals 22 and 23. The magneto-electric converting element 38 provided at a space between the first yoke 32 and the second yoke 34. On the other hand, the terminals 22 and 23 penetrating through the connector portion 21b into the holder portion 21a is solder-mounted to the element basis 37 at each end thereof. The element basis 37 generates an electric current in response to the magnetic force exerted on the magneto-electric converting element 38. Then, the electric current is transmitted through the terminals 22 and 23.

A detecting mechanism of the magnetic force and the vehicle seat position by the element basis 37 (magneto-electric converting element 38) will be explained according to FIG. 4 and FIG. 5.

Figure 4:
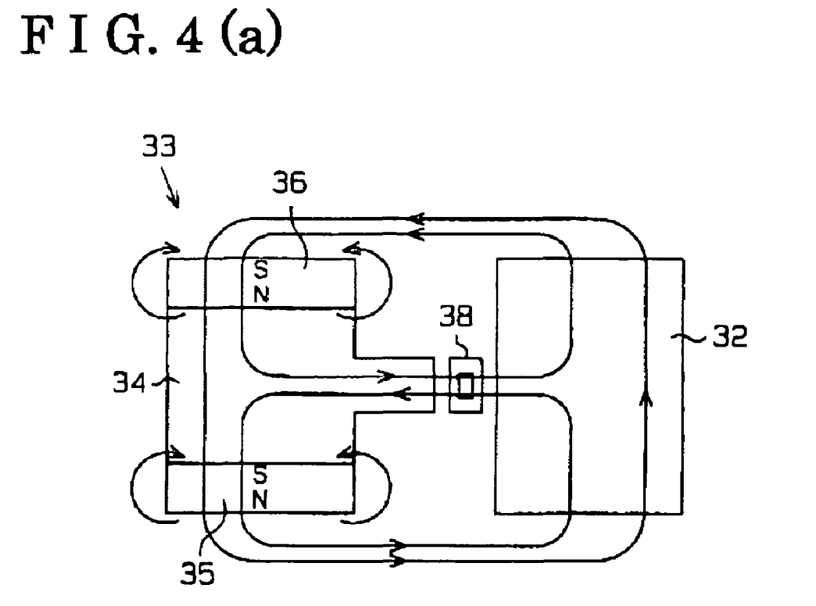
FIG. 4 illustrates a mechanism of the embodiment of the current invention.
Figure 5:
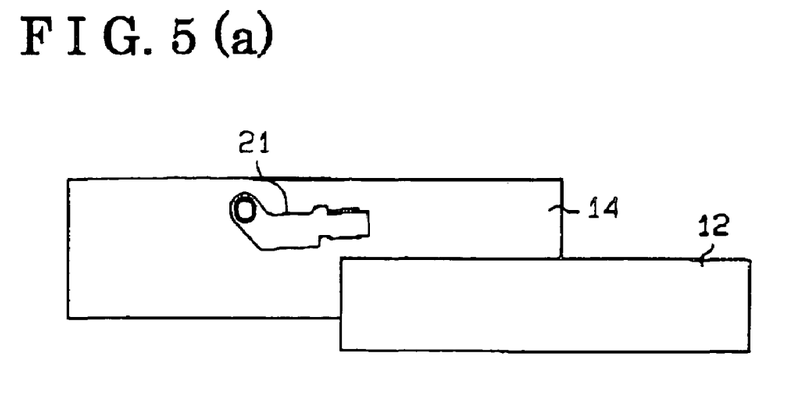
FIG. 5 illustrates explanation drawings of the embodiment of the current invention.

FIG. 4 illustrates explanation drawings of a magnetic circuit generated by the first yoke 32 and the magnetic portion 33. FIG. 5 illustrates pattern diagrams of position of the upper rail 14 relative to the magnetic circuit in FIG. 4.

FIG. 5(a) illustrates a condition that the upper rail 14 projecting in the leftward direction in FIG. 5(a) relative to the lower rail 12, in other words, a condition that the seat slide sensor 21 is not located above the lower rail 12. This condition corresponds to a condition when, for example, the upper rail 14 slides in the front direction of the vehicle relative to the lower rail 12, in other words, the seat is located forward of the vehicle. In this condition, a magnetic circuit of the first magnet 35 is vertically symmetrical to a magnetic circuit of the second magnet 36 except polarities thereof as shown in FIG. 4(a). Thus, a magnetic field formed by the first magnet 35 is vertically symmetrical to a magnetic field formed by the second magnet 36 except directions thereof. The fluxes from the magnets 35 and 36 counteract each other to be cancelled at the magneto-electric converting element 38. In this way, a zero magnetic force is exerted on the magneto-electric converting element 38 provided approximately in line with the projecting portion of the second yoke 34. The point at which magnetic forces counteract each other to be balanced (cancelled) and become zero called a null point. Thus, the element basis 37 generates and transmits a current in response to the zero magnetic force exerted on the magneto-electric converting element 38.

FIG. 5(b) shows a condition that the upper rail 14 is retracted in the rightward direction in FIG. 5(b) relative to the lower rail 12, in other words, the seat slide sensor 21 is located above the lower rail 12. This condition corresponds to a condition when, for example, the upper rail 14 is slid in the rear direction of the vehicle relative to the lower rail 12, in other words, the seat is located on the rear of the vehicle. In this condition, the magnetic force of the first magnet 35 and the magnetic force of the second magnet 36 are not balanced because the iron plate (lower rail 12) provided under the first yoke 32 and the magnet member 33 enhances the magnetic force from the first magnet 35 as shown in FIG. 4(b). Then, a magnetic force corresponding to the gap between the magnetic forces from the first magnet 35 and the magnetic force from the second magnet 36 is exerted on the magneto-electric converting element 38. Thus, the element basis 37 generates and transmits a current in response to the magnetic force exerted on the magneto-electric converting element 38.

A controller (not shown) reads the current transmitted from the element basis 37 and detects the position of the upper rail 14 (seat slide sensor 21) relative to the lower rail 12, in other words, the controller detects the vehicle seat position. The controller can detect, whether the vehicle seat is located on the front or the rear of the upper rail 14 and the lower rail 12. Information of the vehicle seat position is transmitted to an air bag apparatus (not shown) and used, for example, for changing the operation force of the air bag apparatus.

Following effects can be obtained according to the aforementioned embodiment of the current invention.

(1) In the aforementioned embodiment of the current invention, the weld nut 28 is provided at the upper rail 14, and the bolt is penetrated through the hole in the seat slide sensor 21 and screwed into the weld nut 28, so that the seat slide sensor 21 can be directly mounted to the upper rail 14 by screwing the bolt into the weld nut 28. Thus, the mountability of the seat slide sensor 21 to the upper rail 14 can be improved.

(2) In the aforementioned embodiment of the current invention, it is very simple to mount the seat slide sensor 21 to the upper rail 14 using the bole and the weld nut 28.

(3) In the aforementioned embodiment of the current invention, the position defining hole 25 is formed in the upper rail 14, and the position defining pin 24 is formed integrally with the seat slide sensor 21 complementarily to the position defining hole 25. Engaging the position defining pin 24 with the position defining hole 25, the position at which the seat slide sensor 21 is mounted is determined. Thus, this configuration can prevent the seat slide sensors 21 from mounted to positions which vary according to individual products and may cause degradation of the accuracy of the seat position detection.

In addition, the engagement between the position defining pin 24 and the position defining hole 25 can prevent the seat slide sensor 21 from being rotated along a rotation of the bolt screwed into the weld nut 28, so that the mountability of the seat slide sensor 21 to the upper rail 14 can be improved.

(4) In the aforementioned embodiment of the current invention, the seat slide sensor 21 is mounted to the upper rail 14 by a combination of the position defining pin 24 and the hole 26 formed in the seat slide sensor 21, thus the magnet circuit (the first yoke 32 and the magnet member 33) can be easily provided near the lower rail 12 serving as an object. Thus, the lower rail 12 can be detected by a smaller magnet circuit.

(5) In the aforementioned embodiment of the current invention, there is no need to sandwich the lower rail 12 being an object between the magnets 36, 36 and the magneto-electric converting element 38 in order to detect the lower rail 12. In other words, there is no need to provide the magnets 35, 36 and the magneto-electric converting element 38 approximately in line in vehicle width direction, so that mountability can be improved, and more space can be saved under the vehicle seat.

(6) In the aforementioned embodiment of the current invention, a magnetic flux of the first magnet 35 vertically flows out and flows in through a surface at which the seat slide sensor 21 faces to the lower rail 12. Thus, there is no need to hang the seat slide sensor 21 over the upper rail 14 and the lower rail 12, so that more space can be saved under the vehicle seat.

Figure 6:
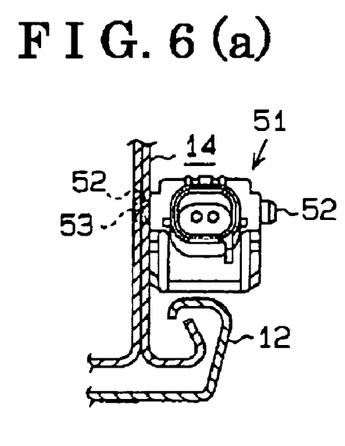
FIG. 6 illustrates a cross-sectional view and a side view of another embodiment of the current invention.

An embodiment of the current invention is not limited only to the above preferred embodiment and may be changed as follows. In the aforementioned embodiment, a seat slide sensor 51 shown in FIGS. 6(*a*) and (*b*) can be applied instead of the seat slide sensor 21. A position defining pin 52 is formed integrally with the seat slide sensor 51 and projects from an upper middle portion of the holder portion 51*a* toward both sides in horizontal direction. On the other hand, a position defining hole 53 is formed in the upper rail 14 complementarily to the position defining pin 52. The seat slide sensor 51 can be mounted to the upper rail 14 at a predetermined position by inserting the position defining pin 52 into the position defining hole 53.

In addition, a hole 54 similar to the hole 26 is formed in the seat slide sensor 51, and a bushing 54 is set into the hole 54. The seat slide sensor 51 is fixed to the upper rail 14 by screwing a bolt (not shown) into the hole 54 into a weld nut welded to the upper rail 14. The seat slide sensor 51 having this configuration can provide the same effects as the aforementioned embodiment.

In the aforementioned embodiment, the seat slide sensor 21 is mounted to the upper rail 14 by the screw, however, the seat slide sensor 21 can be fixed to the upper rail 14 by fitting into the hole in the upper rail 14 or caulking.

In the aforementioned embodiment, the seat slide sensor 21 is mounted to the upper rail 14 for detecting the lower rail 12 being an object; however, the seat slide sensor 21 can be mounted to the lower rail 12 for detecting the upper rail 14 being an object.

A magneto-electric converting element having another configuration can be applied instead of the magneto-electric converting element 38 in the aforementioned embodiment. A magnet circuit having another configuration can be applied instead of the magnetic circuit in the aforementioned embodiment.

In the aforementioned embodiment, the current invention is applied to the means for detecting the vehicle seat position based on the relative position between the upper rail 14 and the lower rail 12; however, the current invention can be applied a means for detecting a position of a slide door or a curtain as long as which can make a slidable movement. Specifically, the current invention can be applied if a device includes a slidable rail and a fixed rail, and a sensor and the like can detect a relative position therebetween.

In the aforementioned embodiment, the current invention is applied to the device which can make a relative straight movement, however, the current invention can be applied to a device which can make a relative circular movement. In addition, according to the aforementioned embodiment, the seat slide sensor 21 is provided apart from the rails in the vertical direction relative to the direction of the movement of the rail for detecting a position at which the seat slide sensor 21 overlaps the rail. However, the seat slide sensor 21 can be provided at the very end portion of the fixed rail in the longitudinal direction thereof for detecting the movable rail which slides to the edge of the fixed rail.

As described above, the mountability of the position detecting means is improved by the current invention according claim 1 through claim 8.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. A seat position detecting apparatus comprising:
a fixed rail adapted to be fixed on a vehicle floor, the fixed rail including an upwardly extending portion, a downwardly extending potion, and a laterally extending upper portion connecting upper ends of the respective upwardly extending portion and downwardly extending portion;
a movable rail adapted to support a vehicle seat and slidably engaged with the fixed rail;
a position detecting device directly mounted on the movable rail for detecting a relative position between the fixed rail and the movable rail by detecting the fixed rail;
the position detecting device comprising a holder portion and a mounting portion, the holder portion housing a magnetic force detecting portion opposed to the laterally extending upper portion of the fixed rail to detect the position of the laterally extending upper portion, the magnetic force detecting portion issuing a magnetic flux circulating in a plane perpendicular to the laterally extending upper portion of the fixed rail so that a portion of the magnetic flux passes through the laterally extending upper portion of the fixed rail along its lengthwise direction, the mounting portion providing a connection between the holder portion and the movable rail; and
a position defining device provided on the holder portion of the position detecting device and the movable rail for positioning the position detecting device relative to the movable rail prior to fixing the position detecting device to the movable rail through the mounting portion.

2. A seat position detecting apparatus according to claim 1, wherein
the mounting portion includes an approximately flat-circular hole, and further comprising:
first engaging means provided at the movable rail at which the position detecting device is mounted, and
second engaging means provided complementarily to the first engaging means and engaging the first engaging means through the approximately flat-circular hole of the position detecting device, and wherein
the position defining device comprises a first position defining device formed in the movable rail at which the position detecting device is mounted, and a second position defining device integrally formed at the position detecting device for engaging with the first position defining device.

3. A seat position detecting apparatus according to claim 2, wherein the first engaging means is a nut, and the second engaging means is a bolt screwed into the nut through the position detecting device.

4. A seat position detecting apparatus according to claim 2, wherein the second engaging means is a nut, and the first engaging means is a bolt screwed into the nut through the position detecting device.

5. A seat position detecting apparatus according to claim 1, wherein the upwardly extending portion and the downwardly extending portion are first and second vertical walls, respectively, and the laterally extending upper portion is a horizontal wall.

6. A seat position detecting apparatus comprising:

a fixed rail adapted to be fixed on a vehicle floor, the fixed rail including an upwardly extending portion, a downwardly extending potion, and a laterally extending upper portion connecting an upper end of the upwardly extending portion and an upper end of the downwardly extending portion;

a movable rail adapted to support a vehicle seat and slidably engaged with the fixed rail, the movable rail including an upstanding wall extending above the laterally extending upper portion of the fixed rail;

a position detecting device directly mounted on the upstanding wall of the movable rail for detecting a relative position between the fixed rail and the movable rail through detection of the fixed rail;

the position detecting device comprising a holder portion and a mounting portion, the holder portion housing a magnetic force detecting portion positioned above and in overlying opposing relation to the laterally extending upper portion of the fixed rail to detect the position of the laterally extending upper portion of the fixed rail, the magnetic force detecting portion issuing a magnetic flux circulating in a plane perpendicular to the laterally extending upper portion of the fixed rail so that a portion of the magnetic flux passes through the laterally extending upper portion of the fixed along its lengthwise direction, the mounting portion providing a connection between the holder portion and the upstanding wall of the movable rail; and a position defining device provided on the holder portion of the position detecting device and the movable rail for positioning the position detecting device relative to the movable rail prior to fixing the position detecting device to the upstanding wall of the movable rail through the mounting portion.

7. A seat position detecting apparatus according to claim 6, wherein the mounting portion includes an approximately flat-circular hole, and further comprising:

first engaging means provided at the movable rail at which the position detecting device is mounted, and second engaging means provided complementarily to the first engaging means and engaging the first engaging means through the approximately flat-circular hole of the position detecting device, and wherein the position defining device comprises a first position defining device formed in the movable rail at which the position detecting device is mounted, and a second position defining device integrally formed at the position detecting device for engaging with the first position defining device.

8. A seat position detecting apparatus according to claim 7, wherein the first engaging means is a nut, and the second engaging means is a bolt screwed into the nut through the position detecting device.

9. A seat position detecting apparatus according to claim 7, wherein the second engaging means is a nut, and the first engaging means is a bolt screwed into the nut through the position detecting device.

10. A seat position detecting apparatus according to claim 6, wherein the upwardly extending portion and the downwardly extending portion are first and second vertical walls, respectively, and the laterally extending upper portion is a horizontal wall.

* * * * *